US012687639B2

(12) United States Patent　(10) Patent No.:　US 12,687,639 B2
Dingler et al.　(45) Date of Patent:　Jul. 21, 2026

(54) USING GLANCING ANGLE DISTANCE TO SEGMENT LiDAR IMAGERY

(71) Applicant: TORC Robotics, Inc., Blacksburg, VA (US)

(72) Inventors: Sebastian Dingler, Stuttgart (DE); Jordan Stone, Christianburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 763 days.

(21) Appl. No.: 18/113,387

(22) Filed: Feb. 23, 2023

(65) Prior Publication Data

US 2024/0103177 A1　　Mar. 28, 2024

Related U.S. Application Data

(60) Provisional application No. 63/376,876, filed on Sep. 23, 2022.

(51) Int. Cl.
| | |
|---|---|
| *G01S 17/931* | (2020.01) |
| *G01S 7/481* | (2006.01) |
| *G01S 17/04* | (2020.01) |
| *G01S 17/89* | (2020.01) |

(52) U.S. Cl.
CPC .......... *G01S 17/931* (2020.01); *G01S 7/4817* (2013.01); *G01S 17/04* (2020.01); *G01S 17/89* (2013.01)

(58) Field of Classification Search
CPC .......... G01S 17/04; G01S 17/42; G01S 17/86; G01S 17/89; G01S 17/931; G01S 7/4802; G01S 7/4817
See application file for complete search history.

(56) References Cited

U.S. PATENT DOCUMENTS

| | | | |
|---|---|---|---|
| 2020/0025923 A1 | 1/2020 | Eichenholz | |
| 2020/0114907 A1* | 4/2020 | Sims, III | ............... G08G 1/162 |
| 2020/0249354 A1* | 8/2020 | Yeruhami | ............. G01S 7/4815 |
| 2023/0358893 A1* | 11/2023 | Pei | ........................ G01S 17/86 |

OTHER PUBLICATIONS

Li, Y., Wang, Y., Deng, W., Li, X et al., "LiDAR Sensor Modeling for ADAS Applications under a Virtual Driving Environment," SAE Technical Paper 2016-01-1907, 2016, https://doi.org/10.4271/2016-01-1907.

* cited by examiner

*Primary Examiner* — Hina F Ayub
(74) *Attorney, Agent, or Firm* — Armstrong Teasdale LLP

(57) ABSTRACT

A method of detecting an object in a path of an vehicle using a LiDAR system includes emitting a LiDAR signal with the LiDAR system; receiving the LiDAR signal with the LiDAR system; determining a glancing angle distance; determining the LiDAR signal is received from beyond the glancing angle distance based on receipt of the LiDAR signal; and classifying the LiDAR signal as a return from an object based at least in part on the LiDAR signal coming from a distance beyond the glancing angle distance.

17 Claims, 9 Drawing Sheets

300

Emit a LIDAR Signal 302

Determine a glancing angle distance (using equation) 304

Receive the LIDAR Signal 306

Compare LIDAR signal with glancing angle distance 308

Classify LIDAR signal return as a return from object 310

Alter vehicle condition (e.g., brake, steer) 312

400

Emit a LIDAR Signal 402

Determine a glancing angle distance (using statistical regression) 404

Receive the LIDAR Signal 406

Compare LIDAR signal with glancing angle distance 408

Classify LIDAR signal return as a return from object 410

Alter vehicle condition (e.g., brake, steer) 412

USING GLANCING ANGLE DISTANCE TO SEGMENT LiDAR IMAGERY

CROSS-REFERENCE TO RELATED APPLICATIONS

This application claims priority to U.S. Provisional Application No. 63/376,876, filed Sep. 23, 2022, which is incorporated by reference in its entirety.

TECHNICAL FIELD

This application generally relates to using LiDAR systems to detect objects in the path of a vehicle, and more particularly, to using LiDAR systems to detect objects on the roadway a long distance ahead of the vehicle.

BACKGROUND

Vehicles having autonomous features and/or capabilities may use sensors to help navigate their environment. LiDARs, cameras, radars, and other sensors (e.g., ultrasonic sensors) may be commonly used to sense such operating environments. LiDAR may be advantageous in some respects because it can return data about where an object is (e.g., a range) with respect to an autonomous vehicle (sometimes referred to as an "ego" or "ego vehicle"). A problem, however, is that LiDAR is an active sensor and inherently limited in its range. That is, the LiDAR detector will only detect reflections off of objects and the distance from which a reflection can be detected is based on characteristics of the emitted LiDAR signal (e.g., magnitude, etc.).

This limitation does not moot or eliminate the use of LiDAR, as using LiDAR remains beneficial. The further distance that a LiDAR can detect and classify objects, the more time a vehicle may have to react to object(s) detected by the LiDAR. For example, by braking, changing lanes, etc. to avoid the object(s). Hence, LiDAR systems with increased capabilities to detect and classify objects at extended range may be required.

SUMMARY

During driving task operations of autonomous vehicles, small objects are challenging to detect. A promising solution includes using LiDARs or ultra long-range LiDARs to detect those objects. However, it is challenging to distinguish objects from the road surface (due to, for example, segmentation problems) and the object itself. For instance, conventional approaches use a point cloud from a LiDAR that must be processed in that way that an object needs to be segmented out in order to distinguish between objects and distinguish the object from the background (e.g., road). This is often process intensive and sometimes ineffective in object detection. Conventional approaches may also rely heavily on map information to differentiate between objects and to distinguish an object and the background (e.g., road). A disadvantage of this conventional approach is that the autonomous vehicle's software requires precise localization information from an accurate, up-to-date map, and also requires precise pose calibration of the LiDAR, which may be unavailable and/or it may not be practicable to rely on these types of information. Embodiments disclosed herein address the shortcomings in the art and may provide additional or alternative benefits as well. The embodiments include systems and methods for detecting objects at longer distances (that conventional approaches struggle to detect) by making use of the physical effect of a glancing angle of LiDAR signals.

In an embodiment, A method of classifying LiDAR returns of LiDAR signals reflected from beyond a glancing angle distance as not being returns from a road, comprising: emitting, by a LiDAR device of an autonomous vehicle, a LiDAR signal; determining, by a controller, a glancing angle distance for the autonomous vehicle; receiving, by the LiDAR device, a return of the LiDAR signal; determining, by the controller, that the return of the LiDAR signal is received from beyond the glancing angle distance based on receipt of the return of the LiDAR signal; and classifying, by the controller, the return of the LiDAR signal arriving from an entity other than the road, based at least in part on the return of the LiDAR signal coming from a distance beyond the glancing angle distance.

In another embodiment, a method of determining that returns from a LiDAR signal reflected from beyond a glancing angle distance are not returns from a road, includes emitting the LiDAR signal with a LiDAR system; determining the glancing angle distance; receiving the LiDAR signal with the LiDAR system; determining the LiDAR signal is received from beyond the glancing angle distance based on receipt of the LiDAR signal; and classifying the LiDAR signal as a return from an entity other than the road based at least in part on the LiDAR signal coming from a distance beyond the glancing angle distance.

In yet another embodiment, a method of classifying an object within a LiDAR point cloud as an object without using segmentation to determine the object comprises: emitting, by a LiDAR device, a LiDAR signal; determining, by a controller, a glancing angle distance; receiving, by the LiDAR device, a LiDAR signal return; determining, by the controller, that the LiDAR signal is received from beyond the glancing angle distance based on receipt of the LiDAR signal; and classifying, by the controller, a source of the LiDAR signal return as an object based on the LiDAR signal return coming from a distance beyond the glancing angle distance.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
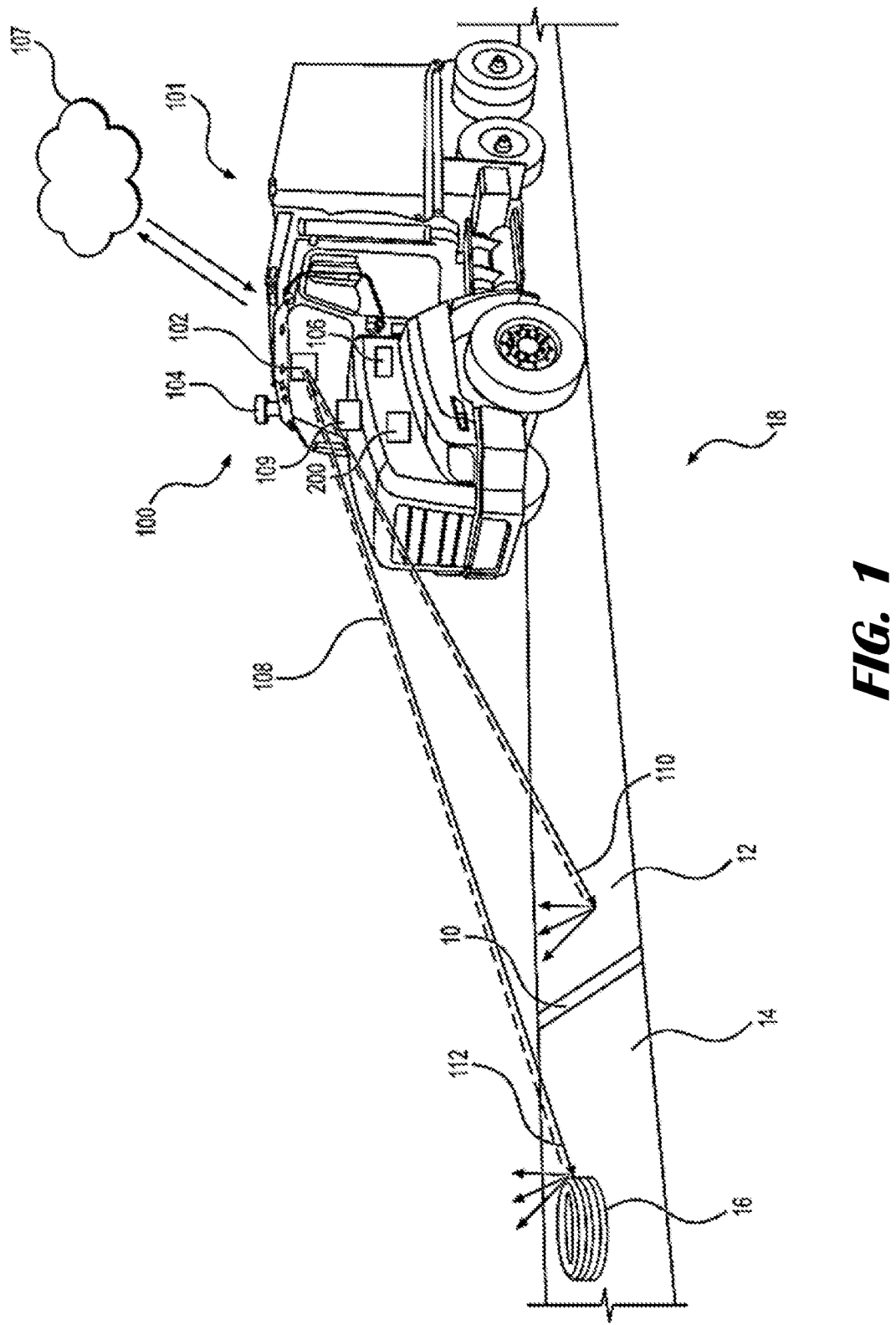
FIG. 1 depicts a vehicle including a system configured to classify a LiDAR signal as a return from an object based on aspects of the LiDAR signal return, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Autonomous vehicle virtual driver systems are structured on three pillars of technology: perception; maps/localization; and behaviors planning and control. The mission of perception is to sense an environment surrounding an ego vehicle and interpret it. To interpret the surrounding environment, a perception engine may identify and classify objects or groups of objects in the environment. For example, an autonomous system may use a perception engine to identify one or more objects (e.g., pedestrians, vehicles, debris, etc.) in the road before a vehicle and classify the objects in the road as distinct from the road. The mission of maps/localization is to figure out where in the world, or where on a pre-built map, is the ego vehicle. One way to do this is to sense the environment surrounding the ego vehicle (e.g., perception systems) and to correlate features of the sensed environment with details (e.g., digital representations of the features of the sensed environment) on a digital map. Once the systems on the ego vehicle have determined its location with respect to the map features (e.g., intersections, road signs, etc.) it can begin to plan maneuvers and or routes with respect to the features of the environment. The mission of behaviors, planning, and control is to make decisions about how the ego should move through the environment to get to its goal or destination. It consumes information from the perception engine and the maps/localization modules to know where it is relative to the surrounding environment and what other traffic actors are doing.

LiDAR can be an important sensor and source of data for a perception engine. LiDAR is a remote sensing method that uses light in the form of a pulsed laser to measure ranges (variable distances). A LiDAR determines the distance of an object or a surface with the formula: $d=c*t/2$ whereas the speed of light is c, the distance between the detector and the object or surface being detected is d, and t is the time spent for the emitted laser beam to travel to the object or surface being detected, then travel back to the detector ("time of flight"). Thus, the basic components of every LiDAR include a laser generator, a photodetector or sensor, and a clock.

LiDAR is an active sensor. That is, because it sends out energy in the form of a laser beam and detects a reflection ("back scatter") of the beam back to a detector it is inherently limited in range based on, for example, the amplitude of the laser pulse, the sensitivity of the detector, the back scattering cross section of the particular object reflecting the signal, and other factors. Because the detector has a lower limit (i.e., sensitivity limit) on the amount of energy it can sense and because the amount of reflected energy is generally inversely proportional to the distance the sensor is from an object, at great distances, it may be difficult to detect reflections from objects.

The amount of energy reflected back to the LiDAR is largely dependent upon a few factors like A) beam divergence (i.e. how quickly the beam cross-sectional diameter grows and the energy density of the beam reduces, B) the rate at which the energy is reflected by or absorbed by the air, C) the amount of energy reflected by the object, and D) the direction of the reflection. When a LiDAR pulse strikes a surface of some object, the laser beam strikes the surface at an angle of incidence (or "incident angle"). The amount of energy reflected back in the same direction of the original beam has a strong correlation to the incident angle: for a given surface, at large incident angles (e.g. 70-90 degrees) the reflection is strong and the return signal is strong; at low angles of incidence (e.g. 0-20 degrees) most of the laser beam can be scattered or reflected away from the LiDAR detector and the return signal may be weak. For a given set of factors affecting the LiDAR return signal strength, there is an angle of incidence where at that angle and all lesser angles of incidence there is not sufficient return signal to register. Because an autonomous vehicle is generally equipped with one or more LiDAR systems having discrete settings (e.g., a discrete setting or range of settings for pulse strength, detector sensitivity, etc.) and is installed on a vehicle at a fixed location in a fixed position, the factor that may affect the return signal strength the most may be the angle of incidence of the laser beam on any particular object.

Generally, the angle of incidence decreases with increasing range in front of the vehicle as the beam incidence flattens. Hence, the further from the front of the vehicle the object is, the less likely the object is to generate a return and the LiDAR may not accurately detect the object. On a flat, large, continuous surface like a road, the further a section of road is from the LiDAR emitter, the shallower the angle of incidence is on that section. At some distance, the angle of incidence may match a "glancing angle," and this distance may be referred to herein as the "glancing angle distance." The glancing angle distance is that distance beyond which no consistent LiDAR signal return is received from the roadway (but may receive consistent LiDAR signal returns from objects on the roadway, depending on their size, orientation, etc.) Though it may be possible to see this region with a camera, it may not with a LiDAR, so it might be difficult to determine the range to an object in that region.

As mentioned, on the portion of the road beyond the glancing angle distance, reliable returns may not always be received. Using LiDAR, it may not be possible to deduce much about the road but there might be useful information regarding objects in the road that is perceptible with LiDAR beyond the glancing angle distance, for example, the presence of objects or road conditions (e.g., potholes, snow, etc.) in the road. Hence, if any returns are received from the area beyond the glancing angle distance, those returns are either random and/or dispersed returns from the road surface, or they could be a return caused by something on the road. The returns from beyond the glancing angle distance can be monitored more closely (i.e., tracked using software) and could eventually be classified as objects if they provide a steady return. because an object on the road would generate returns more consistently—the returns will persist over a time period and do not disappear; at least some of the surfaces of an object on the road are probably not parallel to the road surface, and when the laser beam strikes those surfaces it will be at a different, possibly much higher, incident angle, and therefore generate a stronger return as described in greater detail herein (especially with respect to FIG. 5B). An object on the road should generate several returns grouped or clustered together to begin to paint a picture of the object, these returns should be from the same or similar distance. In contrast, a random return from the surface of the road will usually be sparse (not grouped together). Random returns from the road surface beyond the glancing angle distance will often be quite weak.

Using these logical tests for making a distinction, if there is a grouping of returns on an area that is known to be road beyond the glancing angle distance, and if these returns persist over time and have relatively high energy, these returns are potentially from an object on the road, such as a pedestrian, bicycle, vehicle, lost cargo, etc.

Accordingly, it may be advantageous to know where the road surface is beyond the glancing angle distance. In some embodiments, a virtual driver or other system(s) may tell, at least approximately, where a road is even beyond the glancing angle distance of a LiDAR system. For example, if camera vision is possible, cameras could be used to see where the road is even if the LiDAR cannot. Additionally, a map (e.g., an HD map) and a positioning and orientation of the ego on the map may be used to determine the location of a road before the ego vehicle. The map data could show where the road is and by knowing where the road is, the virtual driver can segment the area of the road beyond the glancing angle distance from the rest of a LiDAR's field of view, and the system may be configured to look for LiDAR returns that are: 1) grouped together and 2) persistent and from within that segment.

Accordingly, a virtual driver or other system may need to know (i.e., calculate) a glancing angle distance in order to segment the portion of the road that is beyond the glancing angle distance. There are multiple methods for calculating the glancing angle distance including calculating the glancing angle distance based on measurable and fixed variables and calculating the glancing angle distance using a statistical method applied to LiDAR signal returns, as described in greater detail herein, especially with respect to FIGS. 3 and 4.

In practice, the actual glancing angle distance (i.e., that distance at which the angle of incidence is too narrow in order for the road to reflect a measureable LiDAR signal return) will constantly shift depending primarily on changes to the reflectivity of the road surface (which could change between areas of different pavement or finishing, or could change with moisture, dust, etc.) and changes to the incident angle (which changes according to the pitch and roll of the truck on which the LiDAR is mounted, and the angle of inclination of the road in front of the truck). The calculated glancing angle distance is thus calculated as an estimate of the actual glancing angle distance and is used to segment the LiDAR return signal into before and beyond the glancing angle distance in order to better classify LiDAR signal returns.

Referring now to FIG. 1, an exemplary system 100 for autonomously operating a vehicle 101 using a LiDAR system 102 is illustrated. The vehicle 101 may have one or more autonomous driving capabilities. For example, the vehicle 101 may have capabilities in any of the five levels of autonomous driving. Specifically, the vehicle 101 may have the capability to change a speed and/or a direction based on a detection of an object in the path of the vehicle 101 using the system 100 as described in greater detail herein. The system 100 may be useful in an autonomous vehicle system or a vehicle with some advanced driver assistance systems that utilize LiDAR perception. The system 100 may further include a GPS system 104, a transceiver 106 for communicatively coupling to one or more external servers 107 (e.g., a cloud server), an inertial measurement unit (IMU) 109, and a controller 200. The LiDAR system 102 may be configured to send a LiDAR signal 108 and receive a LiDAR return signal 110, 112. In FIG. 1, the vehicle exemplified is a truck, however, the systems and methods described herein could be implemented on any type of vehicle or mobile machine.

Still referring to FIG. 1, a roadway 18 in front of the vehicle 101 includes multiple segments. The roadway 18 includes a road segment 12 and a road segment 14. The road segment 12 and the road segment 14 are separated by a glancing angle distance 10. In embodiments, the LiDAR signal can be sent a particular distance based on the characteristics of the LiDAR system 102. The LiDAR signal 108 may be emitted from the LiDAR system 102 at the front of the vehicle 101 to the glancing angle distance 10 and beyond the glancing angle distance 10. The glancing angle distance 10 may be that distance after which a LiDAR signal return scattered from the road way does not reach the vehicle with sufficient energy to generate a LiDAR signal return by the LiDAR system 102 as described in greater detail herein. In the road segment 14 beyond the glancing angle distance 10 is an object 16.

Figure 2:
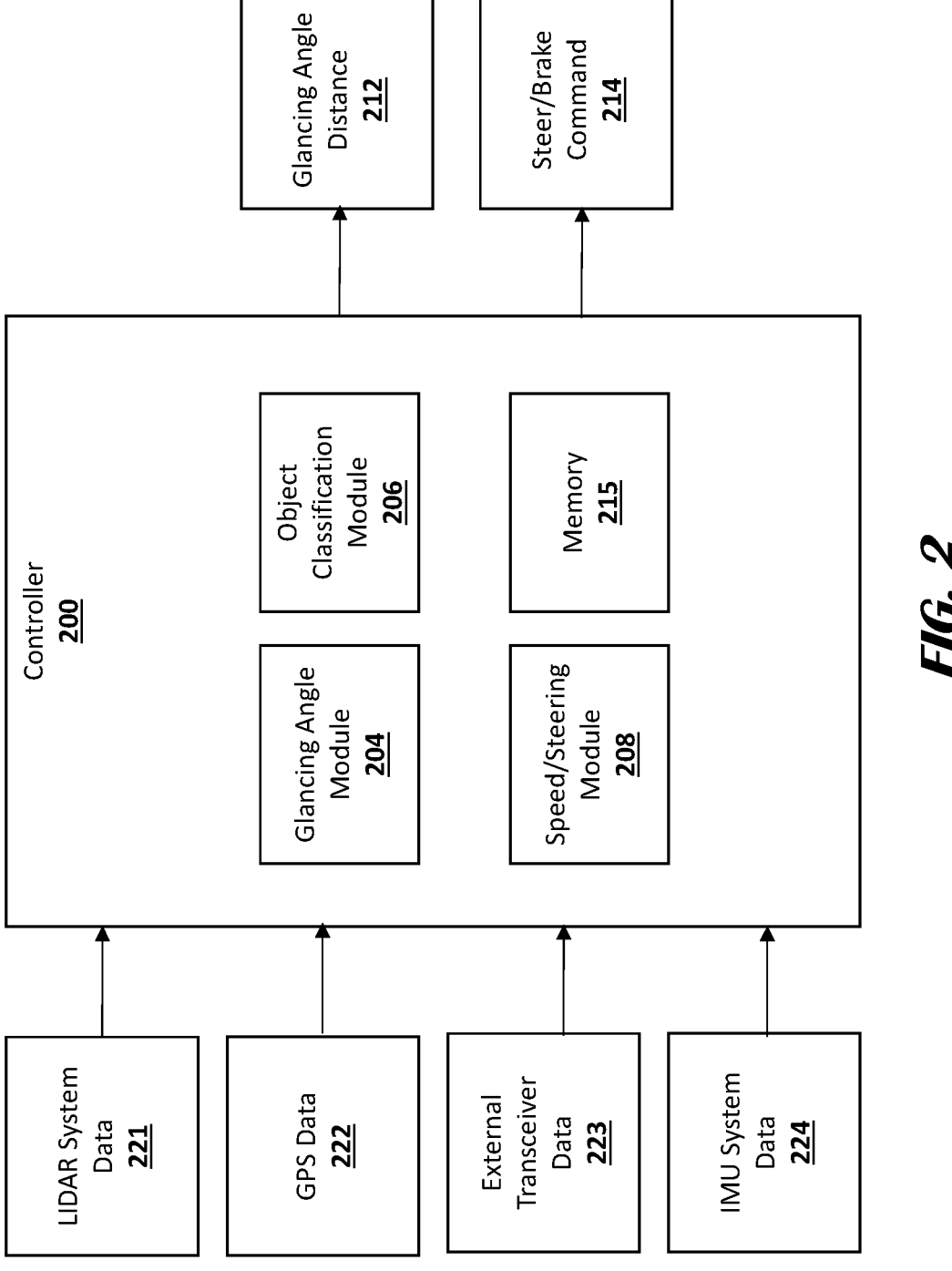
FIG. 2 depicts a controller for the vehicle of FIG. 1, according to an embodiment.

The LiDAR system 102 may include a laser and a detector or other optical device configured to use, for example, LiDAR to detect returns from objects within a field of recognition (FOR) of the LiDAR system 102 to generate LiDAR system data, as described herein with respect to FIG. 2. The LiDAR system 102 may, for example, emit a laser beam and the detector within the LiDAR system 102 may receive a reflection of the laser beam to detect returns from the objects in the environment and generate LiDAR system data. The objects may include, for example, without limitation, a person, an animal, a piece of equipment, another vehicle, water (droplets, pools, etc.), a roadway and/or any other type of object in the environment around the vehicle 101. Various objects may reflect or scatter light at different backscattering cross sections and the LiDAR system 102 may detect these objects at their various cross sections and the detection may be used as an input to the controller 200 to carry out one or more of the processes described herein. LiDAR systems are known for use on vehicles for perception and come in varying types and with various features, and the operations, steps, and functions of LiDAR systems described herein could be accomplished with various LiDAR equipment now known or later developed. In some embodiments, the LiDAR system 102 may be associated with mounting position data of the LiDAR system 102 on the vehicle 101. The mounting position data may include information regarding the orientation, skew, height, pitch, roll, yaw, and vibration characteristics of the emitter(s) and receiver(s) of the LiDAR system 102 and may be used as an input to calculation and/or determination of the glancing angle distance as described herein. The mounting position data may be input to the controller 200 by the installer of the system 100 or by a user of the system 100. In some embodiments, the mounting position data may be alterable by a user.

The GPS system 104 may be positioned, for example, on a portion of the vehicle 101 and may be configured to determine a location of the vehicle 101, which it may embody as GPS system data, as described herein with respect to FIG. 2. The GPS system 104 may be configured to read or otherwise utilize one or more digital maps, such as an HD map. In some embodiments, the GPS system 104 is configured to receive updates from the external network 107. The updates may include one or more of position data, speed/direction data, traffic data, weather data, or other types of data about the vehicle 101 and its environment. In some embodiments, the GPS system 104 may be configured to receive or determine information such as road inclination data associated with an inclination of the road in front of the vehicle 101 and to store such data in the memory 215. Road inclination data may include a slope or gradient of the road in front of the vehicle 101, which may be used to calculate a glancing angle distance as described in greater detail herein. In some embodiments, the road inclination data may come from the LiDAR system 102 or from one or more cameras on the vehicle 101.

The transceiver 106 may communicatively couple the system 100 with one or more external computers or networks via the controller 200. For example, the transceiver 106 may communicatively couple the system 100 with a cloud computing system, which may store one or more programmable instructions, software, or other executable programs that may be implemented by the system 100 to carry out its processes. In some embodiments, the vehicle 101 may receive one or more digital maps, such as an HD map, via the transceiver 106. The digital maps may include information about the environment in which the vehicle 101 operates. For example without limitation, the HD maps may include data related to road surface characteristics (e.g., back scattering cross section, surface type, oil spill locations, etc.), weather conditions, locations of features and objects in the environment, map elements such as road shape, road marking, traffic signs, and barriers, and other data. The HD maps may be stored locally or remotely (e.g., in the external network 107) and may be routinely updated via the transceiver 106. In some embodiments, the transceiver 106 may be configured to receive information such as weather data or road reflectivity data associated with the road in front of the vehicle 101 and to store such data in the memory 215. Road reflectivity data may include information such as, for example, without limitation, a back scattering cross section for a particular road segment, an inclination of a road segment, a pavement or surface type or characteristics. In some embodiments, the road reflectivity data may come from one or more cameras on the vehicle 101.

The IMU 109 may be an electronic device that measures and reports one or more of a specific force, angular rate, and/or the orientation of the vehicle 101, using a combination of accelerometers, gyroscopes, and/or magnetometers. The IMU 109 may provide a signal to the controller 200 in the form of IMU system data and the data may include information regarding, for example, a position, orientation, velocity, and/or acceleration of the vehicle 101. The IMU system data may be used to calculate a glancing angle as described in greater detail herein.

Referring now to FIG. 2, the controller 200 for calculating a glancing angle distance and comparing the glancing angle distance to a distance associated with a LiDAR return signal is shown. The controller 200 may receive inputs 201 from the LiDAR system 102 in the form of LiDAR system data 221, from the GPS system 104 in the form of GPS system data 222, from the transceiver 106 in the form of external transceiver data 223, and from the IMU 109 in the form of IMU system data 224. The controller 200 may store data in a memory 215. The inputs 201 may be used by one or more of a glancing angle distance calculation module 204, an object classification module 206 of a machine-learning architecture, and a speed/steering module 208 to generate outputs 203 which may include a glancing angle distance 212 and a steer/brake command 214.

Still referring to FIG. 2, the controller 200 may embody a single microprocessor or multiple microprocessors that receive the inputs 201 and generate the outputs 203. Controller 200 may include a memory, a secondary storage device, a processor such as a central processing unit, or any other means for accomplishing a task consistent with the present disclosure. The memory or secondary storage device associated with controller 200 may store data and software to allow controller 200 to perform its functions, including the functions described with respect to FIGS. 3 and 4 and one or more steps of methods 300 and 400, described herein. Numerous commercially available microprocessors can be configured to perform the functions of controller 200. Various known circuits may be associated with the controller 200, including signal-conditioning circuitry, communication circuitry, and other appropriate circuitry. Communication between the controller 200 and the various associated systems and components may be wired or wireless, for example, via Bluetooth®, Wi-Fi, radio frequency, etc.

The glancing angle distance calculation module 204 may receive inputs from various systems including from the LiDAR system 102 in the form of LiDAR system data 221, from the GPS system 104 in the form of GPS system data 222, from the transceiver 106 in the form of external data 223, from the IMU 109 in the form of IMU system data 224 and other systems or components to calculate the glancing angle distance. As discussed herein, the glancing angle distance is dependent upon the amount of back scattering of the LiDAR signal received by the LiDAR system at the LiDAR detector. This amount is based on factors such as the distance to an object (e.g., the road, debris, other objects in the road, etc.) off of which the signal scatters, a reflectivity of the object, the beam divergence of the beam emitted with the LiDAR system 102, and the angle at which the beam hits the object. The beam divergence (sometimes referred to as θ) is a constant for a given LiDAR system. The reflectivity and the incident angle will vary for different objects and are based on the geometry of the given LiDAR system 102 and its placement on the vehicle 101. The incident angle can depend on the distance to the object, the orientation(s) of the various surface(s) of the object, and the position and pitch of the LiDAR system 102 (that is, how the LiDAR system 102 is positioned on the vehicle 101, which would be a fixed factor for any given LiDAR system and the current orientation of the vehicle as determined, for example, using IMU system data 224). With brief reference to FIGS. 6A and 6B, a LiDAR system operating on a road with a different pitch will receive returns from an object (e.g., the road itself) in a different manner, and this variation must be compensated for. The incident angle may, for example, be 90 degrees for a distance of 0 m from the LiDAR system (i.e., the maximum incident angle magnitude). And for an object at any given distance (∞ m) from the LiDAR system, the incident angle would be 0 degrees (i.e., the minimum magnitude). Hence, because cos(incident angle) is close to zero for small incident angles the back scatter of the LiDAR signal may approach zero at some distance from the LiDAR system based on the incident angle and other factors. This glancing angle distance (i.e., the distance where the backscatter from the roadway is zero) is different for every environment based on, for example, road conditions, environmental conditions, and vehicle geometry. For example, the LiDAR signal may reflect differently from a road segment 602 with a negative slope than from a road segment 606 with a positive slope. Because the angle of incidence 604 is much smaller than the angle of incidence 608, less signal will be reflected from the negative slope road segment 602 than the positive slope road segment 606. Further, the slope of the vehicle 101 itself may change as it drives along a road and the angle of the emission of the LiDAR beam would thus change, altering the angle of incidence. Accordingly, the glancing angle distance will change as a vehicle drives down a roadway but can be assumed or estimated for a given roadway based on inputs from the various inputs 201 to the system 100 described herein. For example, in some aspects, it may be convenient to consider a bounded section of road as essentially flat, or at least having a constant pitch.

Referring again to FIG. 2, the object classification module 206 includes software programming defining layers and functions of the machine-learning architecture to classify LiDAR return signals. The object classification module 206 may receive inputs from various systems including the LiDAR system 102, the GPS system 104, and the transceiver 106, and other systems or components to classify the LiDAR return signals. For example, the object classification module 206 may classify a LiDAR signal return as being from a road segment or not, or as being from an object or not. In some embodiments, the object classification module 206 may segment LiDAR point clouds (or "images") into one or more segments based on the signal received with the LiDAR system 102. The object classification module 206 may assign one or more labels to one or more points of a LiDAR point cloud, for example, to classify objects in the path of the vehicle 101 or other detected objects. The object classification module 206 may use one or more algorithms (e.g., machine learning algorithms), for example, to determine which objects are in a particular LiDAR point cloud. Additionally, the object classification module 206 may detect objects in a LiDAR point cloud using, for example, classification and localization to determine what objects are in the LiDAR point cloud. The object classification module 206 may, for example, bound one or more objects to separate them within a LiDAR point cloud. Additionally, the object classification module 206 may be configured to segment LiDAR point clouds into one or more regions to make it easier to evaluate the various regions. The object classification module 206 may use one or more of edge detection, Mask R-CNN, clustering, region-based, or other segmentation algorithm. In some embodiments, the object classification module 206 may automatically segment a point cloud and classify an object based on the object returning a LiDAR signal from beyond a glancing angle distance as described in greater detail herein.

The speed/steering module 208 may generate one or more control signals to change a speed or to steer the vehicle 101. The speed/steering module 208 may apply a brake or accelerate the vehicle 101 to slow or speed up the vehicle 101 using, for example, a propulsion control module configured to change the speed of the vehicle. The speed/steering module 208 may be configured to change the turn radius of the vehicle 101 using, for example, a suitable steering control system including a steering control module.

The memory 215 may store software-based components to perform various processes and techniques described herein of the controller 200, including the glancing angle module 204, the object classification module 206, and the speed/steering module 208. The memory 215 may store one or more machine readable and executable software instructions, software code, or executable computer programs, which may be executed by a processor of the controller 200. The software instructions may be further embodied in one or more routines, subroutines, or modules and may utilize various auxiliary libraries and input/output functions to communicate with other equipment, modules, or aspects of the system 100. In some embodiments, the memory 215 may include LiDAR system data 221 related to a specification of the LiDAR system 102, which may include data such as beam characteristics, the resolution, the field of view, and the laser power, which may be used to calculate the glancing angle distance as described in greater detail herein. The memory 215 may also store information about the mounting position and orientation of the LiDAR system 102 as LiDAR system data 221. This information may be input by an operator/owner of the system 100 upon initial setup.

Figure 3:
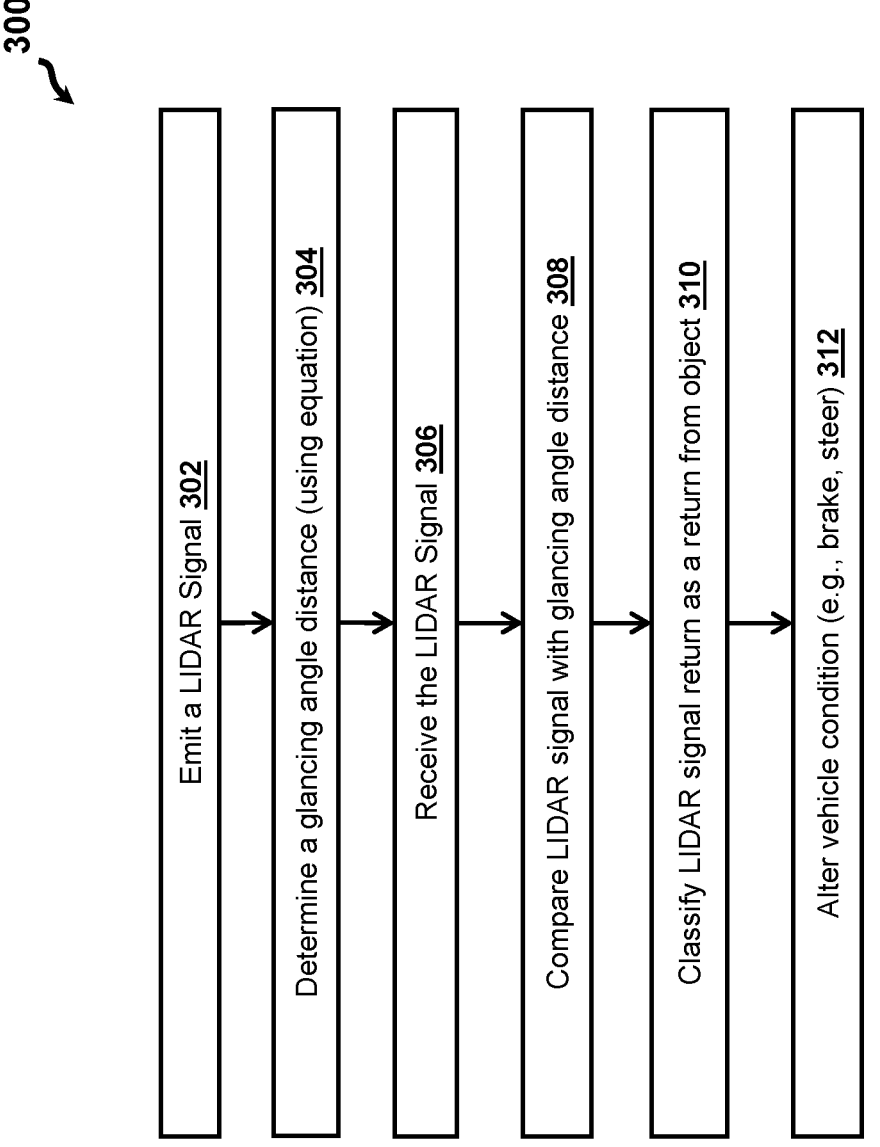
FIG. 3 depicts a method of operating the system of FIG. 1, according to an embodiment.

Referring now to FIGS. 1-3, a method 300 of calculating a glancing angle distance and altering a vehicle condition based on a receipt of a LiDAR signal from beyond the glancing angle distance is described. The steps of the method 300 could be performed in an order as written or a different order (for example, a glancing angle distance may be determined (step 304) before or after receipt of the LiDAR signal (step 306)). As described herein, beyond the glancing angle distance 10, the road segment 14 does not reflect the LiDAR signal 112 back to the LiDAR system 102 with sufficient energy to generate a return (i.e., there are no LiDAR returns generated from reflections of the LiDAR signal from the road segment 14 beyond the glancing angle distance 10). On the other hand, between the glancing angle distance 10 and the LiDAR system 102, the road segment 12 is detected by the LiDAR system 102 based on reflections received from the road segment 12.

Generally speaking, segmentation may process the LiDAR returns into multiple segments, which may also be referred to as "regions" or "objects" with the goal of simplifying or changing the representation of the point cloud image into something more useful or easier to analyze. Segmentation may be used to identify or locate objects and/or boundaries in the LiDAR signal returns (or "output data"). Segmentation may assign a label or labels to one or more points in the resulting point cloud in the LiDAR output such that points with the same label share certain characteristics. Hence, generally, LiDAR systems detecting a roadway must segment or classify returns from objects as a return from an object or as a return from a roadway. If the LiDAR system or systems downstream of the LiDAR system 102 that may process the LiDAR system data to segment and classify the LiDAR point clouds can automatically classify LiDAR signal returns as returns from objects, then the vehicle 101 can take action more quickly based on the objects in its path as described in greater detail herein.

Figure 7:
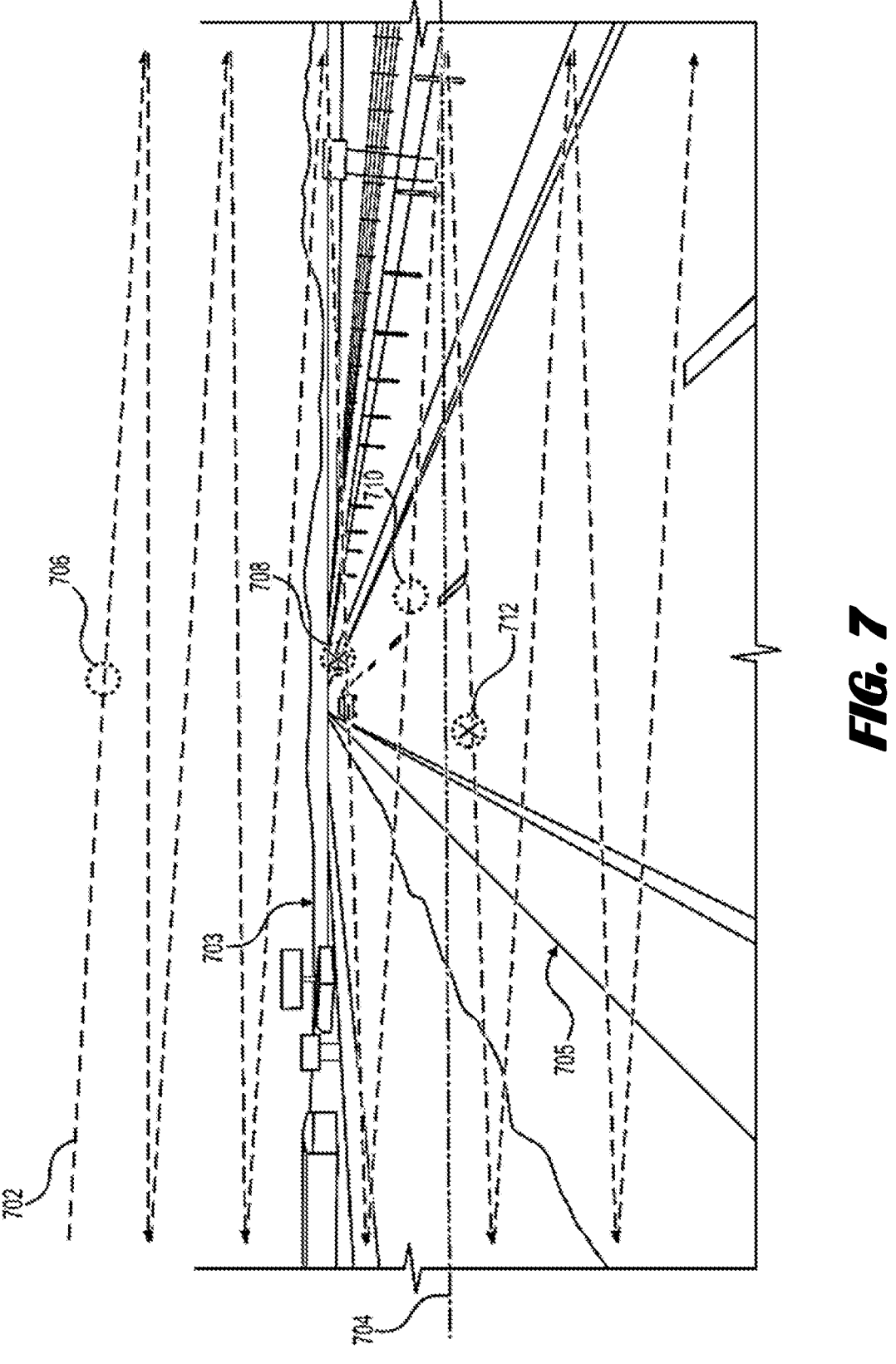
FIG. 7 depicts a particular scenario for operating the vehicle of FIG. 1, according to an embodiment.

At step 302, the LiDAR system 102 may emit a LiDAR signal. In some embodiments, the LiDAR signal may be emitted in a raster pattern (e.g., as shown in FIG. 7), but other scan patterns may be used, for example, a circular pattern or a burst (e.g., all at once). The scan pattern may depend on the mechanism used to direct the signal through the field of recognition and may be a manual or automatically alterable setting associated with the LiDAR system 102.

As discussed, the LiDAR system 102 receives fewer, if any, returns from the road segment 14 beyond the glancing angle distance 10, which may be of insufficient density to register. The actual glancing angle distance is variable based on a number of factors and in some embodiments, but a calculated glancing angle distance may be determined as a particular value or a range of values (or a "glancing angle range") as described herein. Both the actual and calculated glancing angle distances and ranges may depend on, for example, the glancing angle, the road surface absorption characteristics, the inclination of the road along the field of recognition of the LiDAR system 102, the orientation and height of the LiDAR system 102, the specification of the laser or other emitter in the LiDAR system 102 (e.g., the power and the beam divergence), and other factors, such as, for example, a road surface condition (e.g., wet due to inclement weather, oil spill, etc.).

At step 304, the system 100 may determine a calculated glancing angle distance based on the expected backscatter of the LiDAR signal. That is, the calculated glancing angle distance is that distance where the backscatter from the roadway is expected to be zero, or effectively zero, such that returns from beyond the calculated glancing angle distance may be assumed to be from an object, vice the road, as described in greater detail herein. The backscatter of a LiDAR measurement depends on a number of factors including the beam divergence, the distance to the object, the reflectivity of the object, and the incident angle. The beam divergence is a constant for a given LiDAR system and is input to the controller as LiDAR system data 222. Beam divergence is generally defined as the increase in cross-sectional area of the beam in a direction normal to its path of travel as it propagates from the emitter. This may be due to a number of factors including imperfect optics, etc.

The incident angle of the LiDAR signal is based on the position and orientation of the LiDAR system 102 itself (e.g., where the LiDAR system 102 is located on the vehicle 101, the orientation of the LiDAR system 102 on the vehicle 101, whether the LiDAR system 102 is dampened from vibration, etc.) and to the relative inclination of the LiDAR system 102 and the surfaces of the object off of which the LiDAR signal reflects. The position and orientation of the LiDAR system 102 on the vehicle 101 may be fixed, but the inclination of the vehicle 101 itself may not be. Hence, the inclination of the vehicle 101 can be used to determine the angle at which the LiDAR signal is emitted. The inclination of the vehicle 101 can be determined by determining the position of the vehicle 101 using the GPS system data 222 and comparing it with a digital map from the external transceiver data 223. That is, the pitch of the road on the map may be used as an estimate for the pitch of the vehicle and this data may be used by the glancing angle distance module 212. In some embodiments, the system 100 may use data from one or more sensors in the GPS system 104 (e.g., accelerometer, etc.) to determine a vehicle inclination. The inclination of the road segment in front of the vehicle 101 can similarly be determined. Similarly, the reflectivity of the road segment can be determined from external transceiver data 223 (e.g., based on the input from a digital map stored in the external server 107). The road segment reflectivity may include information regarding the reflectivity of the road surface, the state of the road surface (e.g., wet, dry, etc.), and other factors. In some embodiments, the road inclination or the road reflectivity could be determined using input from other sensors, such as, for example, a camera or an alternative LiDAR system.

Figures 6A, 6B:
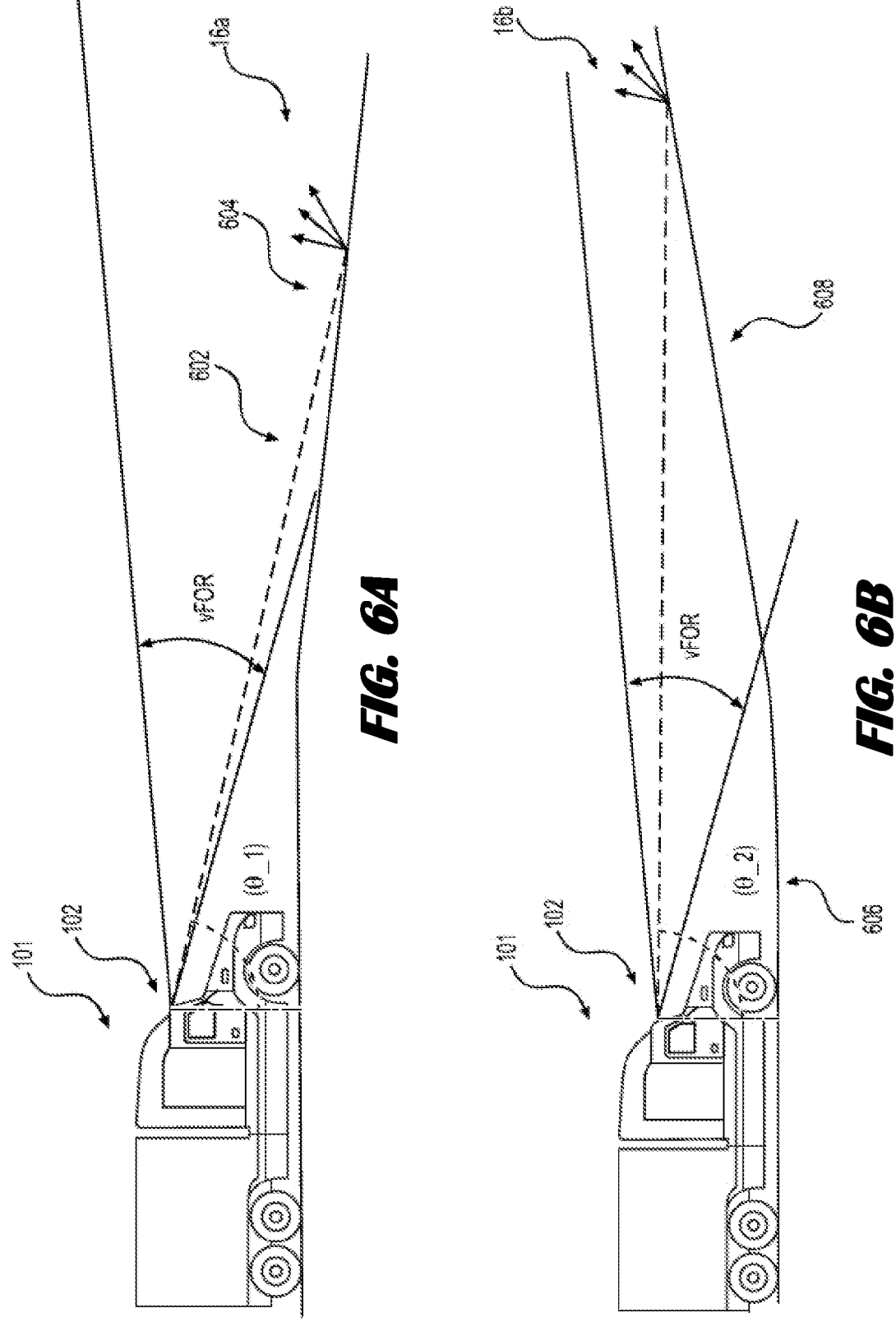
FIG. 6A depicts an embodiment of a method of using systems on the vehicle of FIG. 1, according to an embodiment.
FIG. 6B depicts an alternative embodiment of a method of using systems on the vehicle of FIG. 1, according to an embodiment.

With brief reference to FIGS. 6A and 6B, a LiDAR system with a different height or pitch will provide a different field of recognition. Similarly, the pitch or elevation of the road and orientation of the objects within the field of recognition will also affect the incident angle. The incident angle may, for example, be 90 degrees for a distance 0 m from the LiDAR system. And for an object ∞ m from the LiDAR system, the incident angle would be 0 degrees. Hence, because cos(incident angle) is close to zero for small incident angles the back scatter of the LiDAR signal may approach zero at some distance from the LiDAR system based on the incident angle and other factors. This glancing angle distance, i.e., the distance where the back scatter from the road way is zero is different for every environment based on road conditions, environmental conditions, and vehicle geometry. Accordingly, the glancing angle distance will change as a vehicle drives down a roadway but can be assumed or estimated for a given roadway based on inputs from the various inputs 201 to the system 100 described herein.

At step 306, the LiDAR system 102 may receive the LiDAR signal return. The LiDAR signal return is received based on the LiDAR signal emitted at step 302 above and a distance to the object from which the signal is received is determined. At step 308, the system 100 may determine that the LiDAR signal return is received from an object beyond the glancing angle distance by comparing the LiDAR signal return received at step 306 with the glancing angle distance calculated at step 304. In some embodiments, the LiDAR system 102 may also determine a LiDAR signal return strength, which may include, for example, a magnitude and/or density of the LiDAR signal returns. In some embodiments, there may be one or more random, sparse, and/or low energy returns registered from the roadway (e.g., a rock at the right position could still generate a return). Such random returns will generally not be sufficient to reach or exceed a LiDAR signal return strength threshold (which may be the minimum signal return strength needed to classify a return as a return from an object, which object is beyond the glancing angle distance). Such below-threshold returns may not persist through one or more subsequent cycles of LiDAR detection and hence these returns may not be determined to be LiDAR signal returns from an object.

Based on the determination at step 308, the system 100 may classify the LiDAR signal return as a return from an object (rather than as a return from the roadway) based on the LiDAR signal coming from a distance beyond the glancing angle distance at step 310. That is, because the LiDAR system 102 receives fewer returns at a lower density from the roadway beyond the glancing angle distance, if it receives returns at all, it can be assumed that any return beyond the glancing angle distance is actually a return from an object rather than the road. Accordingly, an appropriate module of the controller 200 can assign labels to the object or objects that caused the LiDAR return signal. This method of label assignment to object(s) detected with LiDAR can more quickly determine objects within the vehicle's path, making it easier for the systems on the vehicle (e.g., an automated driver assistant) to take one or more actions to avoid the object(s).

In use, the calculation of the glancing angle distance may change as the vehicle 101 moves along the roadway. That is, there may be a range of glancing angles calculated which may vary in distance before the vehicle 101 based on the factors for calculating the glancing angle discussed herein (e.g., road reflectivity, elevation, sensor pitch, weather, etc.) In some embodiments, the glancing angle distance may be calculated as a glancing angle range, which is a distance value ahead or behind the glancing angle distance with respect to the vehicle 101 from in which LiDAR return signals may be subjected to additional or different processing as signals beyond the glancing angle range. For example, LiDAR return signals from within the glancing angle range may be processed using additional or different segmentation algorithms than those return signals from beyond the glancing angle range.

At step 312, the vehicle 101 may alter one or more of its speed or direction based on the classification of the object beyond the glancing angle range. That is, the vehicle 101 may autonomously slow, accelerate, steer left or right, or make some other change to its motion to avoid the object. The command to slow, accelerate, steer left or right, or otherwise maneuver may come from the controller 200 as a steer/speed command, for example. As the vehicle 101 maneuvers, it may continue to track the object using the LiDAR system 102 and may make one or more other maneuvers with respect to the object.

Figure 4:
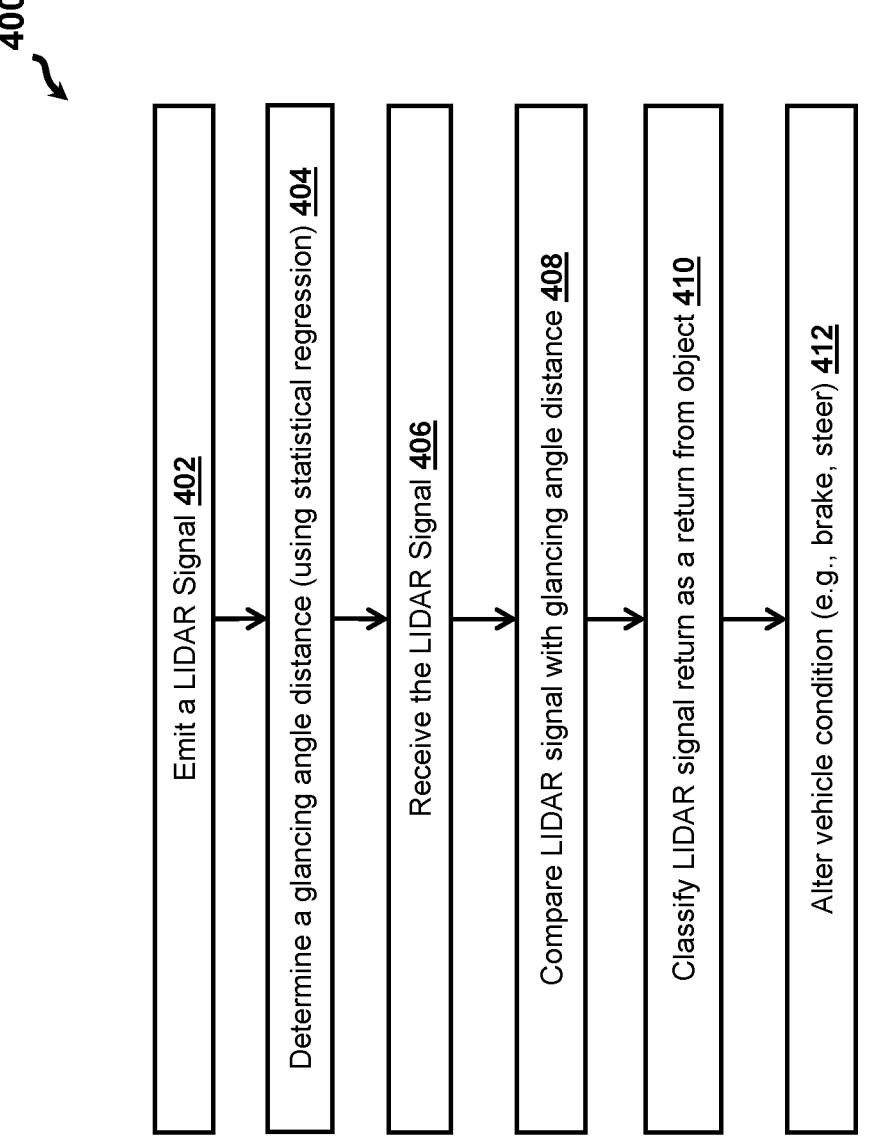
FIG. 4 depicts an alternative method of operating the system of FIG. 1, according to an embodiment.

Referring now to FIGS. 1, 2, and 4, an alternative method 400 of determining a glancing angle distance and altering a vehicle condition based on a receipt of a LiDAR signal from beyond the glancing angle distance is described. The method 400 may be similar to the method 300 described herein, but the determination of the glancing angle may be accomplished differently. At step 402, the LiDAR system 102 may emit a LiDAR signal. In some embodiments, the LiDAR signal may be emitted in a raster pattern, but other scan patterns may be used as discussed above. The scan pattern may depend on the mechanism used to direct the signal through the field of recognition and may be a manual or automatically alterable setting associated with the LiDAR system 102.

At step 404, the system 100 may determine a glancing angle distance using a data based approach. This may be in addition to or in lieu of the calculated glancing angle discussed herein with respect to FIG. 3. At step 404, the glancing angle distance may be statistically derived based on a histogram of the number of returns of the LiDAR signal received at various angles of emission within the field of recognition. As the LiDAR system 102 scans the field of recognition, it receives return signals as the signal backscatters of off objects in the field of recognition. In general, the further from its source the LiDAR scans, the fewer returns it will receive. That is, the signal will backscatter to the LiDAR sensor at a lower rate.

To determine at which angle the LiDAR signal is emitted, the controller 200 may receive LiDAR system data 221, GPS data 222, external transceiver data 223, and/or IMU system data 224. The LiDAR system data 221 may include information related to the orientation and position of the LiDAR system 102 on the vehicle 101 as well as the vertical angle of any particular emitted LiDAR signal and the time between signal emission and return. The IMU system data 224 may include information regarding the pitch of the vehicle 101 that may be used to calculate an orientation of the LiDAR system 102 based on the known LiDAR specification and orientation. In some embodiments, the controller 200 may receive GPS data 222 to determine a location of the vehicle 101 and may compare the location of the vehicle 101 with a digital map (e.g., HD map) to determine an inclination of the road segment in front of the vehicle 101. With this data, the system 100 can geometrically determine a horizontal distance from which a particular LiDAR signal returns. Based on the horizontal distance at which return signals drop to or below a threshold value (e.g., zero), the system 100 can use this horizontal distance to determine a glancing angle distance.

Figure 5A:
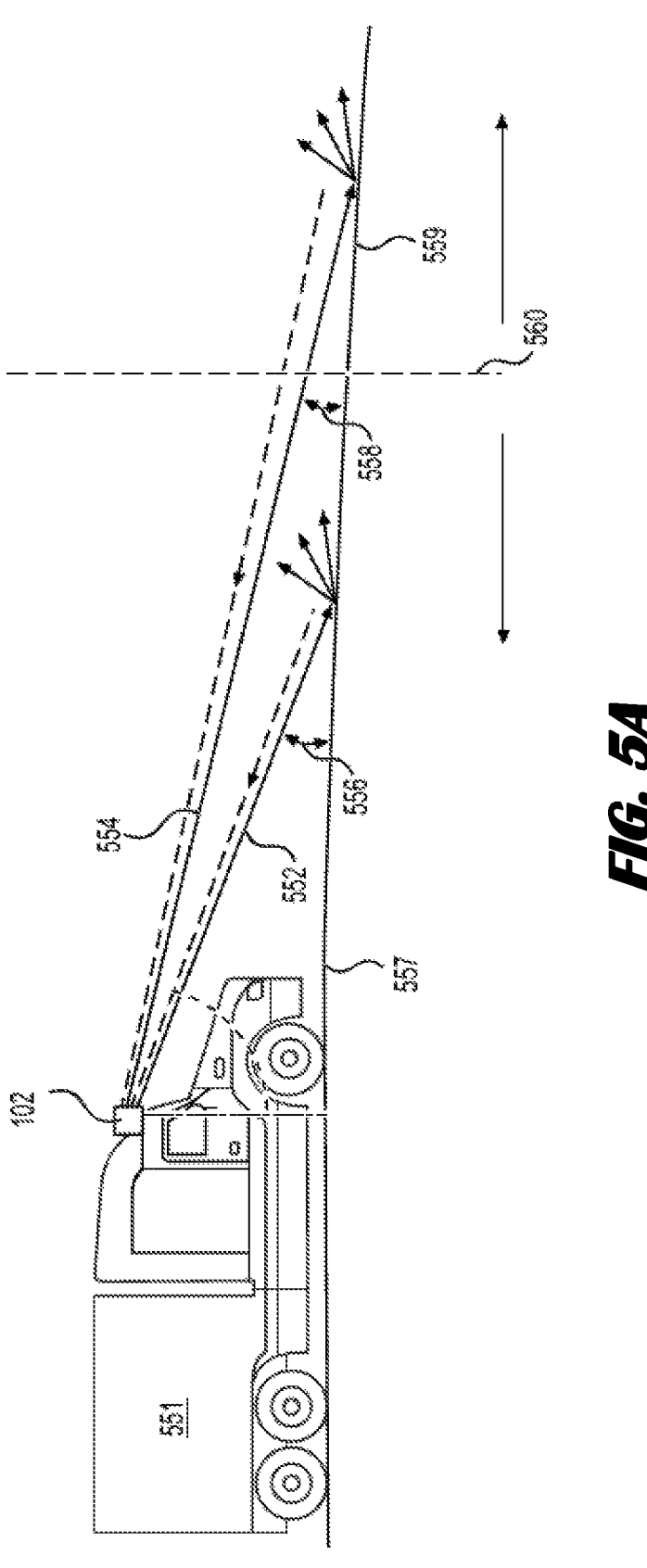
FIG. 5A depicts a vehicle, such as the vehicle of FIG. 1, using a LiDAR system to detect one or more objects, according to an embodiment.
Figure 5B:
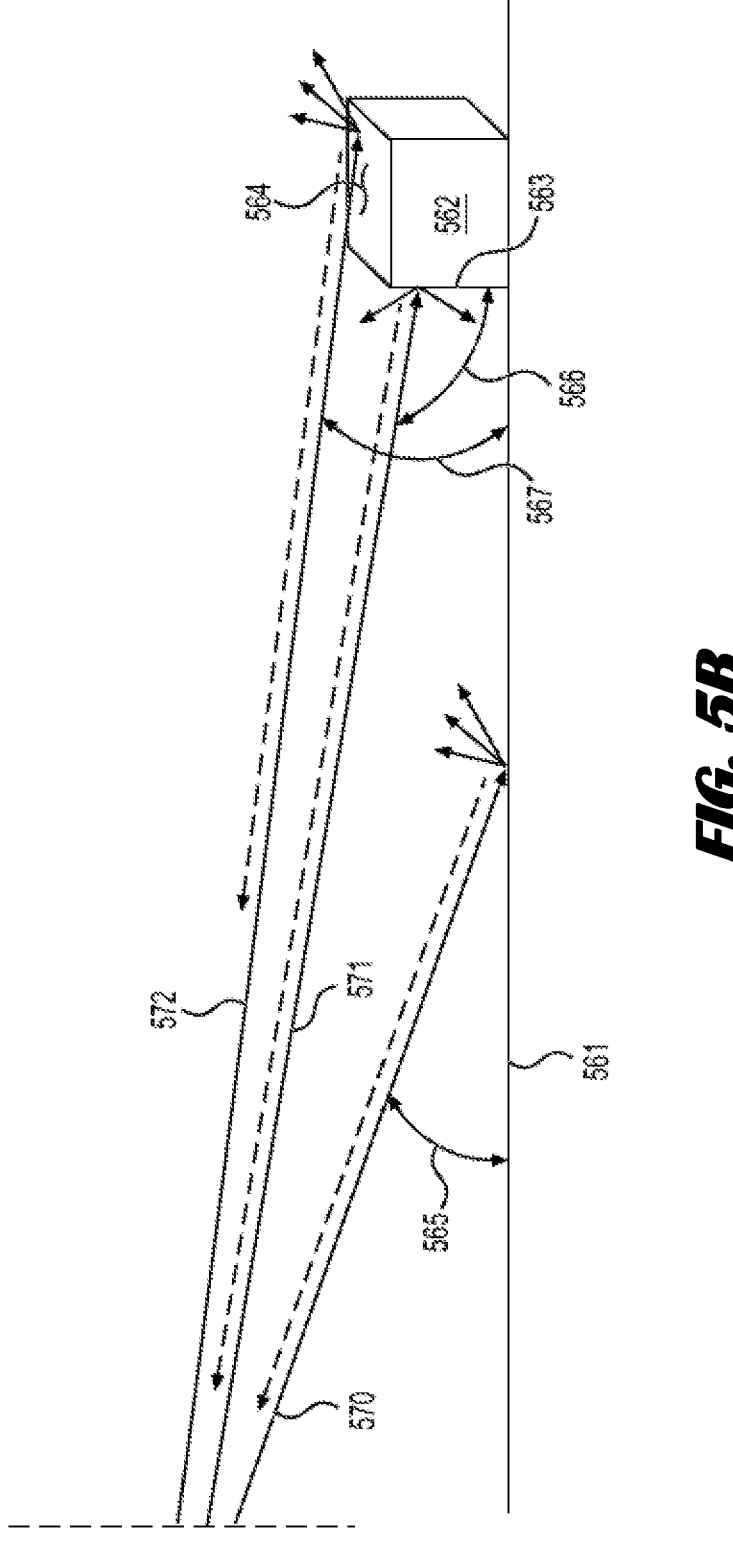
FIG. 5B depicts a scenario of using LiDAR on a vehicle, such as the vehicle of FIG. 1, to detect an object past a glancing angle distance, according to an embodiment.
Figure 5C:
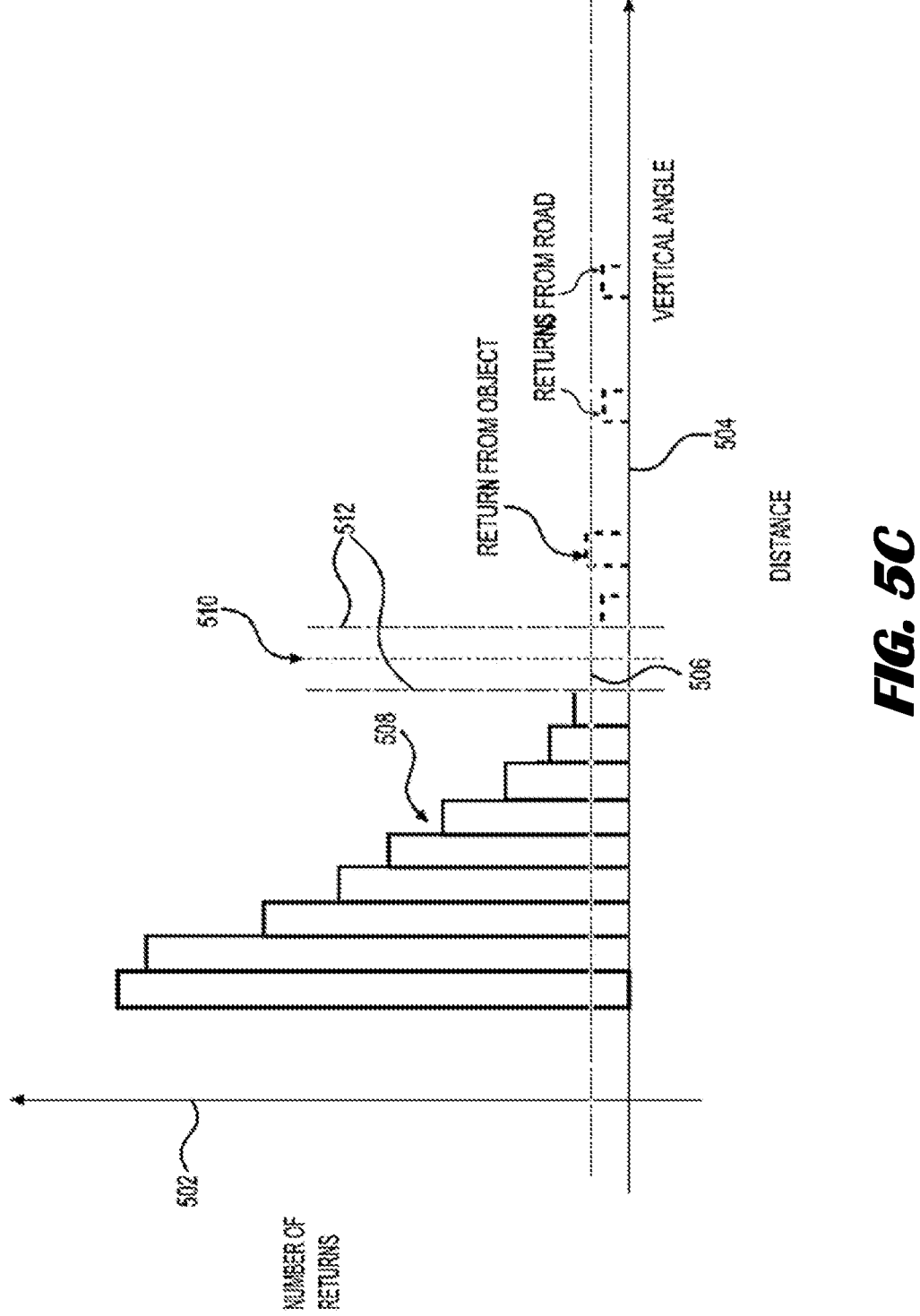
FIG. 5C depicts a chart including a number of LiDAR returns as compared to a distance using systems of a vehicle, such as the vehicle of FIG. 1, according to an embodiment.

FIGS. 5A and 5B show a scenario for generating the LiDAR return signal profile represented by the histogram of FIG. 5C. The histogram of FIG. 5C plots a number of returns 502 registered in the LiDAR system 102 for a particular beam angle bin 508. Each value of the beam angle bin 508 may correspond to a horizontal distance from the LiDAR system in front of the vehicle 101.

FIG. 5A shows a vehicle 551 emitting a LiDAR signal at two different angles. The first LiDAR signal angle 552 and the second LiDAR signal angle 554. The incidence angle 556 of the LiDAR signal on a road surface 557 is greater than the incidence angle 558 of the LiDAR signal on a road surface 559. As the incidence angle decreases, the number of returns generated based on reflected signals within the LiDAR system 102 decreases based on the weakened strength of the reflected signals from portions of the road which are struck by the LiDAR signal at low incidence angles (e.g., from beyond a glancing angle distance 560). There may still be some returns from reflections of the road surface 559 beyond the glancing angle distance 560, but the number and strength of returns from beyond the glancing angle distance is greatly reduced as compared with the number of returns reflected from the road surface 557 before the glancing angle distance.

FIG. 5B depicts an area beyond the glancing angle distance 560 that includes a road segment 561 on which an object 562 with a first surface 563 and a second surface 564 rests. The emitted LiDAR signals 570, 571, 572 strike the road surface (of the road segment 561) at a first angle 565, the first surface 563 at a second angle 566, and the second surface 564 at a third angle 567, respectively. The various surfaces will reflect the LiDAR signal back to the LiDAR system 102 at different magnitudes based on the angle of incidence at which the emitted LiDAR signal strikes the surface. For example, the first angle 565 may be too small such that no LiDAR signal return is generated with the LiDAR system 102 (FIG. 5A). However, reflection from the first surface 563 of the object 562 may register a return because the signal is reflected at a much more direct angle (e.g., closer to ninety degrees, based on the flat surface 563, which faces the vehicle 551 (FIG. 5A)). Reflections from the second surface 564 may not register as returns because the angle between the second surface 564 and the emitted LiDAR signal 572 is near zero. Hence, the vehicle 551 may determine an object is in its path (e.g., the object 562) based on the returns reflected from the first surface 563.

FIG. 5C depicts a histogram generally showing the scenario depicted in FIGS. 5A and 5B. A number of returns 502 are plotted against a horizontal distance 504 before the vehicle 551. As described with respect to FIGS. 5A and 5B, there are generally fewer LIDAR signal returns registered as the emitted LiDAR signal strikes a feature at a greater distance before the vehicle and the incidence angle of the LiDAR signal on that particular object decreases towards zero (i.e., infinite distance). In some embodiments, the LiDAR signal may be emitted in discrete vertical angle bins 508 (e.g., corresponding to beam emission angles of 0 deg. 5 deg. 10 deg., etc.) and the number of returns 502 may be counted for a given vertical angle bin 508. Eventually, the number of returns for a particular vertical angle bin 508 may equal or drop below a threshold value 506. The threshold value 506 may be calculated, for example, to correspond to the calculated glancing angle distance. Hence, the distance before the vehicle where the number of returns 502 falls below the threshold value 506 may correspond to the glancing angle distance 510. In some embodiments, there may be a glancing angle range 512, which may be, for example, a minimum and maximum range on either side of the glancing angle distance 510 that may account for some noise in the signal returns The system 100 may use this statistically determined glancing angle distance 510 to automatically classify returns from beyond the glancing angle distance 510, which are above the threshold 506, as returns from an object. For example, with respect to FIG. 5B, the system 100 may receive a return signal return from an emitted beam that strikes the first surface 563 that registers above the threshold value 506 of FIG. 5C but may not receive a return above the threshold value 506 the surface 564 or the surface of the road segment 561. Hence, the system 100 may be able to automatically classify the object 562 based on the sufficiently strong return signal and may take one or more actions based on the return from the object 562 (e.g., brake, slow, maneuver, etc.)

At step 406, the LiDAR system 102 may receive the LiDAR signal. The LiDAR signal is received based on the LiDAR signal emitted at step 402 and a distance to the object from which the signal is received is determined. At step 408, the system 100 may determine that the LiDAR signal is received from an object beyond the glancing angle distance by comparing the LiDAR signal received at step 406 with the glancing angle distance calculated at step 404.

Based on the determination at step 408, the system 100 may classify the LiDAR signal as a return from an object (rather than as a return from the roadway) based on the LiDAR signal coming from a distance beyond the glancing angle distance at step 410. That is, because the LiDAR system 102 does not receive returns from the roadway beyond the glancing angle distance as discussed herein, it can be assumed that any return beyond the glancing angle distance is actually a return from an object rather than the road. Accordingly, an appropriate module of the controller 200 can assign labels to the object or objects that caused the LiDAR return signal. This method of label assignment to objects detected with LiDAR can enable the system 100 to label objects appropriately more quickly, providing more time for the vehicle 101 to react to the object.

In use, the statistical determination of the glancing angle distance can include a range of values. That is, there may be a glancing angle range 512 which may be a range of distances surrounding the glancing angle distance 510, which may be determined by setting a statistical threshold based on the number of returns for one or more vertical bins as discussed herein. In some embodiments, LiDAR return signals received from within the glancing angle range 512 may be subjected to additional or different processing as signals beyond the glancing angle range 512. For example, LiDAR return signals from within the glancing angle range 512 may be processed using additional or different segmentation algorithms that those return signals from beyond the glancing angle range.

At step 412, the vehicle 101 may alter one or more of its speed or direction based on the classification of the object beyond the glancing angle range. That is, the vehicle 101 may autonomously slow, accelerate, steer left or right, or make some other change to its motion to avoid the object. The command to slow, accelerate, steer left or right, or otherwise maneuver may come from the controller 200 as a steer/speed command, for example. As the vehicle 101 maneuvers, it may continue to track the object using the LiDAR system 102 and may make one or more other maneuvers with respect to the object.

Referring now to FIGS. 6A and 6B, the autonomous vehicle 101 including the LiDAR system 102 is shown approaching an object 16a and 16b on a road in two different scenarios. In a first scenario, the vehicle 101 approaches a road segment 602 with a decreasing elevation profile (indicated by the angle of incidence 604). The object 16a lies on the road segment 602 in the path of the vehicle 101. In a second scenario, the vehicle 101 approaches a road segment 606 with an increasing elevation profile (indicated by the angle of incidence 608). Because the road segment 602 has a decreasing elevation, the back scattering from the object 16a will be less than as compared with the back scattering from the object 16b on the increasing elevation profile (indicated by the angle of incidence 608). This is an example of how differing objects can have different back scattering thresholds and would appear differently on scans of the LiDAR system 102 based on their elevation with respect to the LiDAR system 102.

Referring now to FIG. 7, an example scan of a vertical field of regard is shown. The scan is completed with a LiDAR system such as the LiDAR system 102 of FIG. 1, which may use a collimated laser beam that may illuminate a single point or multiple points at a time. The LiDAR system 102 may scan the field of regard in a raster pattern 702 and may include a time-of-flight camera including a point sensor that may detect the laser's time of flight (i.e., the amount of time it takes the laser to leave the emitter, hit its target, and return to the sensor). The raster pattern 702 may sweep left and right as the LiDAR system 102 scans vertically as shown forming a "sawtooth wave" pattern. That is, the raster pattern 702 may follow a systematic process of covering the area progressively, one line at a time. In some systems the LiDAR system 102 may use a different pattern, such as a rectangular wave or square wave pattern. As the LiDAR system 102 scans, it may store data in a buffer, such as a refresh buffer or a frame buffer, for example. In other embodiments, the LiDAR system 102 may use, in addition or in the alternative, a flash LiDAR, which may use a 1-D or 2-D sensor array, which may collect 3-D location and intensity information from each pixel in the vertical field of regard.

Still referring to FIG. 7, the field of regard may be separated into two separate regions: a first region 703 beyond a glancing angle distance and a second region 705 before the glancing angle distance. The LiDAR system 102 or associated system (e.g., the controller 200) may be configured to scan the first region 703 and the second region 705 differently in some embodiments. For example, a duty cycle of the LiDAR system 102 may be configured such that the LiDAR system 102 scans the first region 703 more than the second region 705.

As the LiDAR system scans, it moves from top to bottom of the field of regard (in this particular instance, the particular description is non-limiting and the laser could scan the field of regard in any direction or pattern, as discussed above). It may come to a first point 706. At point 706, the LiDAR system 102 will receive no return because the laser does not hit an object, but is only pointed at the sky. The LiDAR system 102 will continue its scan and come to point 708, where it may receive a return from an object. At point 708, the LiDAR system 102 may receive the return and immediately classify the return as a return from an object based on the object being beyond a glancing angle distance 704. At point 710, the LiDAR system 102 may not receive a return because the particular aspects of the road, the laser, and other factors may not allow for a sufficient return of the LiDAR signal from that point. For example, the road may absorb too much of the signal or the glancing angle may be too great such that not enough of the laser reflects back to the sensor of the LiDAR system. However, at point 712, which is within the glancing angle distance 704, the road may reflect the LiDAR signal.

Thus, the glancing angle distance 704 may divide the vertical field of regard into an area where segmentation of the image is not necessary. That is, beyond the glancing angle distance 704, return signals of the LiDAR may be automatically classified or labeled as returns from objects. And hence, within an image generated by the LiDAR, the objects associated with those return signals may be labeled, classified, and tracked as objects, thus identifying objects more quickly and giving the vehicle 101 more time to react to the object(s).

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

In some embodiments, a method of detecting an object in a path of a vehicle comprises emitting, by a LiDAR device, a LiDAR signal; receiving, by the LiDAR device, a return of the LiDAR signal; determining, by a controller, a glancing angle distance for the return of the LiDAR signal; determining, by the controller, that the return of the LiDAR signal is received from beyond the glancing angle distance based upon receipt of the return of the LiDAR signal; and classifying, by the controller, the return of the LiDAR signal returning from an object, based at least in part on the return of the LiDAR signal arriving from a distance beyond the glancing angle distance.

In some implementations, the method includes calculating a glancing angle range.

In some implementations, the glancing angle distance is determined as a function of a backscatter threshold, a road reflectivity, an incident angle of the LiDAR signal, and a beam divergence of the LiDAR signal.

In some implementations, one or more of the road reflectivity and the incident angle are based on an input from a digital map.

In some implementations, the digital map is an HD map.

In some implementations, one or more of the backscatter threshold and the beam divergence are properties of the LiDAR system.

In some implementations, the glancing angle distance is compared with a statistical glancing angle distance that is determined based on a signal return threshold.

In some implementations, the LiDAR system emits the LiDAR signal in a raster pattern.

In some implementations, a duty cycle of the LiDAR system includes a higher proportion of scans in a region beyond the glancing angle distance than in a region before the glancing angle distance.

In some implementations, object segmentation is used to classify and track the object generating the LiDAR return signal after the LiDAR return signal is classified as a return from an object.

In some embodiments, a method of classifying LiDAR returns comprises emitting, by a LiDAR device of an autonomous vehicle, a LiDAR signal; determining, by a controller, a glancing angle distance for the autonomous vehicle; receiving, by the LiDAR device, a return of the LiDAR signal; determining, by the controller, that the return of the LiDAR signal is received from beyond the glancing angle distance based on receipt of the return of the LiDAR signal; and classifying, by the controller, the return of the LiDAR signal arriving from an entity other than the road, based at least in part on the return of the LiDAR signal coming from a distance beyond the glancing angle distance.

In some implementations, the glancing angle distance is a function of a backscatter threshold, a road reflectivity, an incident angle of the LiDAR signal, and a beam divergence of the LiDAR signal.

In some implementations, one or more of the road reflectivity and the incident angle are based on an input from a digital map.

In some implementations, the glancing angle distance is compared with a statistical glancing angle distance that is determined based on a signal return threshold.

In some implementations, a duty cycle of the LiDAR system includes a higher proportion of scans in a region beyond the glancing angle distance than in a region before the glancing angle distance.

In some embodiments, a method of classifying an object within a LiDAR point cloud as an object without using segmentation to determine the object comprises: emitting, by a LiDAR device, a LiDAR signal; determining, by a controller, a glancing angle distance; receiving, by the LiDAR device, a LiDAR signal return; determining, by the controller, that the LiDAR signal is received from beyond the glancing angle distance based on receipt of the LiDAR signal; and classifying, by the controller, a source of the LiDAR signal return as an object based on the LiDAR signal return coming from a distance beyond the glancing angle distance.

In some implementations, the glancing angle distance is a function of a backscatter threshold, a road reflectivity, an incident angle of the LiDAR signal, and a beam divergence of the LiDAR signal.

In some implementations, the method includes comparing the received LiDAR signal return to a threshold value. The classification of the source of the LiDAR signal return as an object is based on the comparison with the threshold value.

In some implementations, the glancing angle distance is compared with a statistical glancing angle distance that is determined based on a signal return threshold.

In some implementations, a duty cycle of the LiDAR system includes a higher proportion of scans in a region beyond the glancing angle distance than in a region before the glancing angle distance.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of detecting an object in a path of a vehicle, comprising:
   emitting, by a LiDAR system, a LiDAR signal;
   receiving, by the LiDAR system, a return of the LiDAR signal;
   determining, by a controller, a glancing angle distance for the return of the LiDAR signal as a function of a backscatter threshold, a road reflectivity, an incident angle of the LiDAR signal, and a beam divergence of the LiDAR signal;
   determining, by the controller, that the return of the LiDAR signal is received from beyond the glancing angle distance based upon receipt of the return of the LiDAR signal; and
   classifying, by the controller, the return of the LiDAR signal as a return from an object, based at least in part on the return of the LiDAR signal arriving from a distance beyond the glancing angle distance.

2. The method of detecting an object of claim 1, further comprising calculating a glancing angle range.

3. The method of claim 1, wherein one or more of the road reflectivity and the incident angle are based on an input from a digital map.

4. The method of claim 3, wherein the digital map is an HD map.

5. The method of claim 1, wherein one or more of the backscatter threshold and the beam divergence are properties of the LiDAR system.

6. The method of claim 1, wherein the glancing angle distance is compared with a statistical glancing angle distance that is determined based on a signal return threshold.

7. The method of claim 1, wherein the LiDAR system emits the LiDAR signal in a raster pattern.

8. The method of claim 1, wherein a duty cycle of the LiDAR system includes a higher proportion of scans in a region beyond the glancing angle distance than in a region before the glancing angle distance.

9. The method of claim 1, wherein object segmentation is used to classify and track the object generating the LiDAR return signal after the LiDAR return signal is classified as a return from an object.

10. A method of classifying LiDAR returns, comprising:
    emitting, by a LiDAR system of an autonomous vehicle, a LiDAR signal;
    determining, by a controller, a glancing angle distance for the autonomous vehicle;
    receiving, by the LiDAR system, a return of the LiDAR signal;
    determining, by the controller, that the return of the LiDAR signal is received from beyond the glancing angle distance based on receipt of the return of the LiDAR signal; and
    classifying, by the controller, the return of the LiDAR signal arriving from an entity other than the road, based at least in part on the return of the LiDAR signal coming from a distance beyond the glancing angle distance,
    wherein a duty cycle of the LiDAR system includes a higher proportion of scans in a region beyond the glancing angle distance than in a region before the glancing angle distance.

11. The method of claim 10, wherein the glancing angle distance is a function of a backscatter threshold, a road reflectivity, an incident angle of the LiDAR signal, and a beam divergence of the LiDAR signal.

12. The method of claim 11, wherein one or more of the road reflectivity and the incident angle are based on an input from a digital map.

13. The method of claim 10, wherein the glancing angle distance is compared with a statistical glancing angle distance that is determined based on a signal return threshold.

14. A method of classifying an object within a LiDAR point cloud as an object without using segmentation to determine the object, comprising:

emitting, by a LiDAR system, a LiDAR signal;

determining, by a controller, a glancing angle distance as a function of a backscatter threshold, a road reflectivity, an incident angle of the LiDAR signal, and a beam divergence of the LiDAR signal;

receiving, by the LiDAR system, a LiDAR signal return;

determining, by the controller, that the LiDAR signal is received from beyond the glancing angle distance based on receipt of the LiDAR signal; and classifying, by the controller, a source of the LiDAR signal return as an object based on the LiDAR signal return coming from a distance beyond the glancing angle distance.

15. The method of claim 14, further comprising:

comparing the received LiDAR signal return to a threshold value; wherein the classification of the source of the LiDAR signal return as an object is based on the comparison with the threshold value.

16. The method of claim 15, wherein the glancing angle distance is compared with a statistical glancing angle distance that is determined based on a signal return threshold.

17. The method of claim 14, wherein a duty cycle of the LiDAR system includes a higher proportion of scans in a region beyond the glancing angle distance than in a region before the glancing angle distance.

* * * * *